Figure 1:
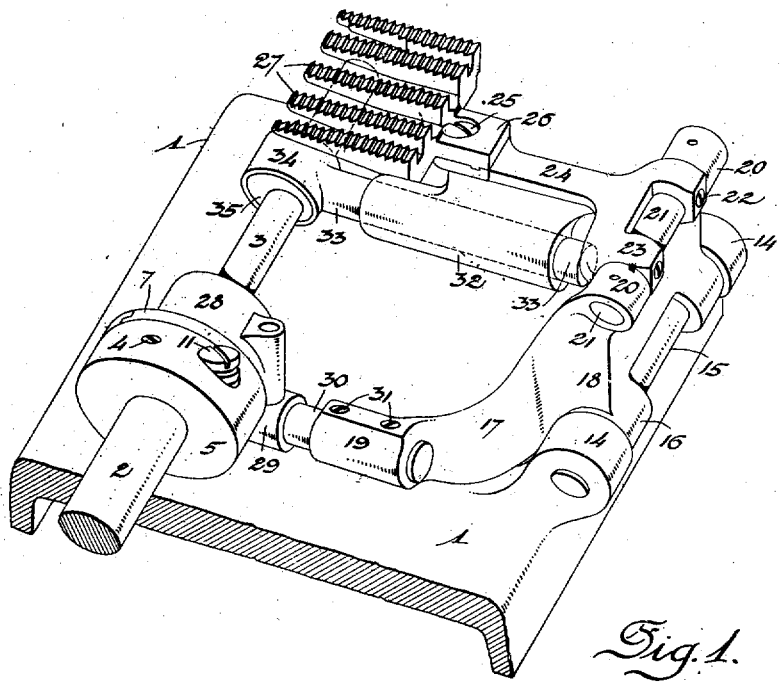

A. H. DE VOE.

FEEDING MECHANISM FOR SEWING MACHINES.

APPLICATION FILED SEPT. 9, 1916.

Reissued Nov. 28, 1916.

14,218.

WITNESS:

G. L. Tenn

INVENTOR

Albert H. De Voe

BY

Henry J. Miller

ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

FEEDING MECHANISM FOR SEWING-MACHINES.

14,218. Specification of Reissued Letters Patent. Reissued Nov. 28, 1916.

Original application filed January 30, 1911, Serial No. 605,391. Divided and this application filed January 23, 1914, Serial No. 813,841. Original No. 1,148,446, dated July 27, 1915. Application for reissue filed September 9, 1916. Serial No. 119,307.

*To all whom it may concern:*

Be it known that I, ALBERT H. DE VOE, a citizen of the United States, residing at Westfield, in the county of Union and State of New Jersey, have invented certain new and useful Improvements in Feeding Mechanisms for Sewing-Machines, of which the following is a specification, reference being had therein to the accompanying drawings.

This invention has for its object to provide a simple, strong and durable feeding mechanism particularly for that class of sewing machine provided with a rotary shaft beneath the work-plate, although adapted for machines of other types.

The invention consists essentially in the provision of the rocking frame or feed-rocker with a slide-pin-and-socket connection with a strap embracing an actuating crank or eccentric of the shaft, thereby providing the most direct connections and substantial bearings for their component relatively movable parts to insure freedom from lost motion, quiet running and durability in extended use.

The invention further includes a similar form of connection between the strap embracing the feed-lifting crank or eccentric and the feed-bar pivotally connected with said rocking frame.

As represented in the accompanying drawings, the present feeding mechanism is that of my pending application Serial No. 793,535, filed October 6, 1913, and embodies the constructive features of that represented in the drawings of my Patent No. 1,085,801 of February 3, 1914, of which this application constitutes a division.

Figure 2:
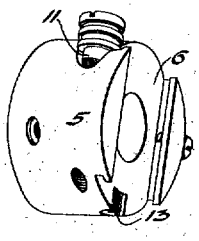
Figure 3:
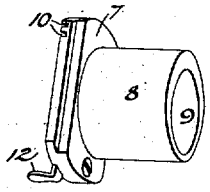
Figure 4:
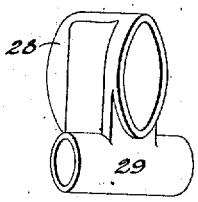

Figure 1 is a perspective view of portions of the bed-plate and main-shaft and the feeding mechanism embodying the present improvement. Figs. 2, 3 and 4 are perspective views, representing respectively the collar sustaining the feed-actuating eccentric, the said eccentric and the eccentric strap.

Suitably mounted above the machine base 1 and beneath the cloth-plate is the rotary shaft 2 whose forward end portion 3 is reduced in diameter. Secured upon the shaft 2 by means of set-screws 4 is the collar 5 formed in one face with the undercut guide-way 6 to which is applied the slide-plate 7 having its edges fitted to the walls of said guide-way and formed upon one face with the feed-actuating eccentric 8 having the elongated aperture 9 surrounding the reduced portion 3 of the shaft. The slide-plate 7 is provided adjacent one edge with rack-teeth 10 adapted for engagement with the adjusting screw 11 applied to the collar 5 of which one side extends into the guide-way 6. The slide-plate 7 has at one end the lug 12 pressed laterally by means of the spring 13 introduced in a suitable socket of the collar 5 to prevent lost motion between the slide-plate and adjusting screw.

The base 1 is shown provided at one edge with the upwardly extending perforated lugs 14 entered by the pivotal pin 15 upon which are mounted the spaced bearing lugs 16 of the rocking frame or feed-rocker formed with the lateral arm 17 and the upwardly extending member 18, the former being formed with the tubular boss 19 and the latter with the spaced apertured bearing lugs 20. Journaled in the lugs 20 is the pin 21 upon which are secured by the set-screws 22 the spaced lugs 23 at one end of the feed-bar 24 having secured upon the opposite end by means of the screw 25 the foot 26 of the feed-dog 27 of well known form.

Embracing the feed-actuating eccentric 8 is the eccentric-strap 28 having formed preferably integral therewith the transverse tubular boss 29 affording a socket in which is slidingly fitted the pin 30 which is secured by the set-screws 31 within the boss 19 of the rocking frame. The feed-bar 24 has depending therefrom the tubular boss 32 affording a socket in which is slidingly fitted the pin 33 projecting laterally from the strap 34 which embraces the feed-lifting eccentric 35 fixed upon the reduced portion 3 of the shaft 2.

By means just described, the feed-actuating eccentric 8 imparts to the feed-rocker operative movements which are transmitted endwise to the feed-bar 24 to which are communicated from the feed-lifting eccentric 35, through the strap 34 and pin 33, the usual rising and falling movements. By the direct pin-and-socket connections between the pivotally connected feed-dog sustaining members and the straps embracing the feed-actuating and feed-lifting eccentrics, respectively, the relatively movable parts of the mechanism are of such character as to exclude the lint and dirt which are deposited upon various parts of the mechanism in the continued operation of the machine upon the work, while relatively long cylindrical bearings are permitted so as to insure freedom from lost motion and deterioration of the running parts by wear.

Pins 30—33 fitted in tubular bosses 19 and 32 constitute pin-and-socket connections the relatively reciprocable elements of which have a common axis. They may be termed pin-and-coaxial-socket connections and motion may be transmitted through either to the other for doing work such as converting rotary into reciprocating movement.

Having thus set forth the nature of the invention, what I claim herein is:—

1. In a sewing machine, the combination with a shaft provided with feed-actuating and feed-lifting elements, adjusting means for varying the effective action of said feed-actuating element, and a rocking frame, of a strap embracing the feed-actuating element, a pin-and-socket connection between and having component elements rigidly attached respectively to said strap and frame, a feed-bar pivotally connected to said frame, a feed-dog mounted thereon, and a connection between said feed-lifting element and the feed-bar.

2. In a sewing machine, the combination with a shaft provided with feed-actuating and feed-lifting elements, adjusting means for varying the effective action of said feed-actuating element, and a rocking frame, of a strap embracing the feed-actuating element and provided with a socket transverse to said shaft, a pin rigidly secured to said frame and slidingly fitted to said socket, a feed-bar pivotally connected to said frame, a feed-dog mounted thereon, and a connection between said feed-lifting element and the feed-bar.

3. In a sewing machine, the combination with a shaft provided with feed-actuating and feed-lifting eccentrics, a rocking frame, a feed-bar pivoted thereto, and a feed-dog mounted upon said feed-bar, of straps embracing the said eccentrics, a pin-and-socket connection between and having component elements rigidly attached respectively to the feed-actuating eccentric strap and rocking frame and a pin-and-socket connection between and having component elements rigidly attached respectively to the feed-lifting eccentric strap and feed-bar.

4. In a sewing machine, the combination with a shaft provided with feed-actuating and feed-lifting eccentrics, a rocking frame, a feed-bar pivoted thereto and provided with a socket transverse to its pivotal connection with said frame, and a feed-dog mounted upon said feed-bar, of a strap embracing the feed-actuating eccentric and provided with a socket transverse to the shaft, a pin rigidly secured to said frame and entering said socket, and a strap embracing the feed-lifting eccentric and provided with a rigid laterally projecting pin and entering the socket of said feed-bar.

5. In a sewing machine, in combination feed-actuating and feed-lifting eccentrics, a feed-dog, straps embracing said eccentrics, and pin-and-coaxial-socket connections between said straps and said feed-dog whereby a four-motion feed is obtained.

6. In a sewing machine, in combination feed-actuating and feed-lifting eccentrics, a feed-dog, straps embracing said eccentrics, pin-and-coaxial-socket connections between said straps and said feed-dog, and having component elements fixedly carried respectively by said straps.

7. In a four-motion feed for sewing machines, in combination, feed-actuating and feed-lifting elements, a feed-dog, means operatively connecting said dog with said feed-lifting element including a pin-and-coaxial-socket connection located beneath and in line with the load carried by said feed-dog, and positive means operatively connecting said dog with said feed-actuating element whereby feeding and lifting movements are imparted to the feed-dog.

ALBERT H. DE VOE.